H. E. BORGER.
ELECTRIC LIGHTING SYSTEM.
APPLICATION FILED JAN. 29, 1918.
1,404,187.
Patented Jan. 24, 1922.
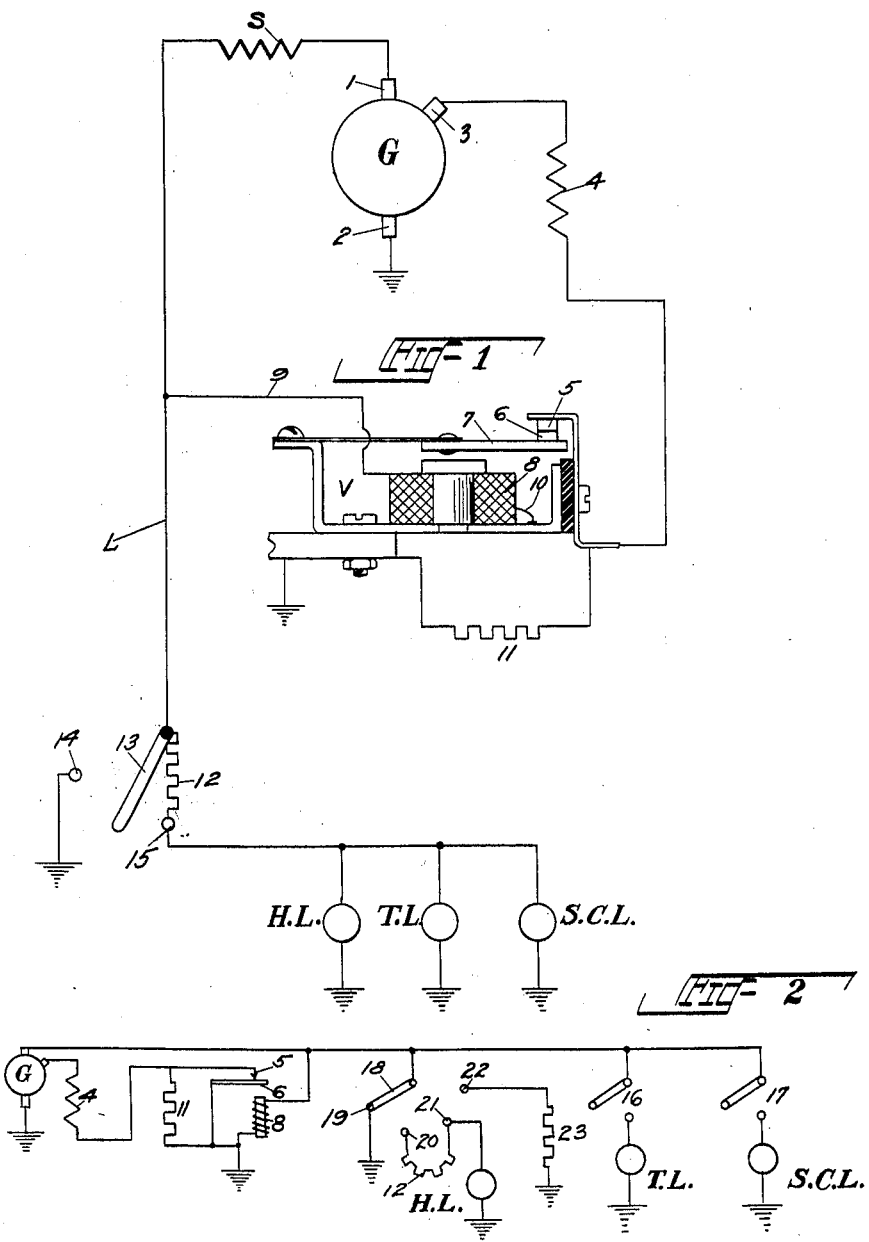
INVENTOR
HENRY E. BORGER
Albion D. T. Libby
ATTORNEY

UNITED STATES PATENT OFFICE.

HENRY E. BORGER, OF NEWARK, NEW JERSEY, ASSIGNOR TO SPLITDORF ELECTRICAL COMPANY, OF NEWARK, NEW JERSEY.

ELECTRIC LIGHTING SYSTEM.

1,404,187.   Specification of Letters Patent.   Patented Jan. 24, 1922.

Application filed January 29, 1918.   Serial No. 214,372.

*To all whom it may concern:*

Be it known that I, HENRY E. BORGER, a citizen of the United States, residing at Newark, in the county of Essex and State of New Jersey, have invented certain new and useful Improvements in an Electric Lighting System, of which the following is a specification.

For the purpose of lighting automotive vehicles such as automobiles and motorcycles it has become standard practice, among practically all of the manufacturers of such vehicles, to light them with electric light current which is furnished by a generator and storage battery, the battery being automatically connected to the generator when a certain predetermined speed is reached for the purposes of charging it, and the lights connected to a discharge circuit supplied with current from the battery or, when the generator is connected therethrough by the generator, the battery being then bridged across the lights and taking part of the current from the generator, if the speed thereof is sufficient to produce more current than the lights require, or the battery may furnish part of the current for the lights when the speed of the generator is below a certain given point.

On a motorcycle the space for mounting a battery is very limited. Furthermore, the vibration is much more on a motorcycle than on an automobile and a battery installed thereon is subject to greater vibration which is injurious to it.

Since the speed of an automobile or motorcycle varies over a wide range the generator is also subject to extreme variations in speed. This is particularly true of a lighting generator used on a motorcycle for such a generator must be made small in order to go into the limited space, and for the further reason that the output required is relatively low hence the generator is usually driven at speeds considerably in excess of the engine crank shaft, hence its maximum speed is very high, in some cases reaching approximately 8,000 R. P. M. In order to regulate a generator operating over wide speed variation it has been customary to use a voltage vibrator regulator or a current vibrator regulator or depend on what is known as third brush regulation, all of which methods of regulation are used in connection with a storage battery which is necessary to take the load of the generator and thereby hold the voltage across the lamps within a working range.

Such arrangements or methods of lighting always contemplate the use of a storage battery. In fact in the last two methods of regulation mentioned without the battery on the lights the lamps will burn out long before the maximum speed is reached and I have found that the voltage vibrator regulator alone cannot be depended on to give proper regulation without the battery; particularly under the extreme speed conditions met with on motorcycles as it is very hard to make the vibrator regulator work throughout the entire range of speed of a motorcycle. Should, for any reason, the vibrator contacts stick together then the voltage of the generator will immediately rise and burn out the lights.

It is the object of my invention to provide a system in which the lights and other apparatus on the vehicle may be operated without the use of a storage battery, although it is to be understood that a battery can be used.

In order to simplify the system for motorcycle work, I have done away with the storage battery, all automatic cutouts and even switches in the individual light circuits may be omitted and in order to reduce the load on the engine during the day time when the lights are not required I provide means for "killing" the generator so that it will not "build up" and generate current.

Other and further objects will be apparent after a study of this specification and drawings, wherein like numbers refer to corresponding parts in the different views.

In the drawing, Figure 1 is a diagrammatic illustration of one form of my system or method of lighting.

Figure 2 indicates a slight modification of Figure 1.

In Figure 1 G illustrates the generator, preferably of the direct current type, having load circuit brushes 1 and 2 and a third brush 3, preferably of the adjustable type, adapted to run on the commutator of the generator intermediate the two load brushes which are of opposite polarity.

While I have shown only two load brushes 1 and 2 four or more brushes may be utilized to suit the design of the generator. 4 is a field winding of the generator having one terminal connected to the third brush 3. The other end of the main excitation winding 4 is connected to a contact 5 which cooperates with contact 6 attached to the vibrating armature 7 of vibrator V. Vibrator V has an operating coil 8 which is connected by wire 9 to one of the load brushes 1 and by wire 10 to the frame of the vibrator which is grounded. The load brush 2 is grounded so that the vibrator coil 8 is connected across the load circuit. The resistance 11, preferably non-inductive in character, is connected across the vibrator contacts 5 and 6 so that as the armature 7 is vibrated the resistance 11 is cut in and out of circuit with the field coil 4 of generator G. S represents a series winding in the load circuit which may or may not be used as will be referred to hereinafter. Connected to the load circuit through a resistance 12 are shown lights which are designated HL for headlight, TL for tail-light and SCL for side car light. The switch lever 13 is connected to one end of the resistance 12 and when in contact with the stud 15 is adapted to short circuit the resistance 12. When the switch lever is on stud 14 the line or load wire L is grounded, which in effect is a short circuit on the generator G. When this short circuit is maintained by the switch lever 13 being in contact with the stud 14 the generator G is unable to "build up" and consequently will not generate any current. When it is desired to switch on the lights the switch lever 13 is moved to the position shown in Figure 1. It is a well known fact that tungsten lights which are almost universally used at the present time, have a low resistance when cold, consequently if the number of lights is large or the candle power considerable, the effect of switching them on to the generator would be practically a short circuit and the generator would, in some cases, fail to pick up. I, therefore, introduce the resistance 12 for the purpose of increasing the resistance across the generator brushes to such a point as it will "build up." After the generator is "built up" as indicated by the glow of the lamps or by the ammeter, if one is used, the switch lever 13 is then thrown to contact with the stud 15 thereby short circuiting the resistance 12 allowing the lamps to receive the full potential of the generator. It is seen that the resistance 12 may be used as a dimmer if desired.

It is a well known fact that on account of the armature reactions in a dynamo that the load brushes in many cases need to be shifted forward in the direction of rotation to obtain the points of maximum voltage but that in starting the point of maximum voltage is in retard of what it is during running. I make use of these facts in the regulation of my generator in that I connect the main field excitation winding to the third brush and place this third brush to substantially correspond with the point of approximately highest voltage at low speed of the generator and I connect my vibrator coil winding across the main brushes which, at the time of starting, are not up to maximum potential but which under high speed conditions receive a potential higher than at the third brush. This arrangement aids the generator to "build" up at low speed because the potential at the third brush becomes lower as above explained so that the current through the winding 4 is reduced, due to the placing of the third brush and in addition the vibrator which is connected across the points of maximum voltage is working in combination with the third brush to produce a better result than heretofore attained. With this double combination, I am able to hold the voltage across the lights substantially constant without the use of a battery.

It may be pointed out at this time that if a low resistance armature is used in the generator G and this is driven at a high speed that it may be found that the resistance 12 is not required. On the other hand, if a high resistance armature is used and driven at relatively low speeds the resistance 12 is required.

Under certain conditions, depending on the characteristics of the generator and the way they are driven by the engine, a few series turns S on the generator field may be advantageous for at extremely high speeds the current value in the winding 4 may drop so low or the vibration may effect the third brush 3 to such an extent that the field flux will be too low for steady lights. Under this condition I have found that a few series turns help to steady the field so that the lights will be maintained at substantially uniform candle power. I have also found that in some cases the series winding at the generator assists in starting where the lamps are of low resistance. I, therefore, may or may not use the series windings S depending on the manner and speed at which the generator is to be driven.

In Figure 2 I have shown the tail light and side car light as having individual switches 16 and 17 while the headlight is connected to one point of a four-way switch the lever of which 18 is shown as connected to the stud 19, grounding or cutting out the generator G. When the lever 18 is thrown to contact with stud 20 the resistance 12 is cut into circuit with the headlight which is usually of much larger candle power than the other lights and the generator will "build up" after which the switch lever 18 is thrown into contact with the stud 21 putting full voltage across the headlight. When the switch lever 18 is thrown to contact with stud 22 the resistance 23 is bridged across the load circuit. The resistance 23 offers substantially the same load as the headlight so that the headlight may be cut off and yet maintain a uniform load on the generator which in some cases is found to be advantageous.

While I have shown diagrammatically the method in which my system can be operated I do not wish to be limited to any particular type or kind of apparatus as these parts may be varied over wide limits without departing from the spirit of my invention and the scope of the appended claims.

Having thus described my invention what I claim is:—

1. In an electric lighting system a generator having load circuit brushes and a load permanently connected thereto, means for maintaining substantially a constant voltage across said load, means for short circuiting said load circuit when the current is not required, means comprising a resistance interposed between the generator and the load for permitting the building up of the generator and means for short circuiting said resistance.

2. In an electric lighting system, the combination of a generator having load circuit brushes, a field winding having one end connected to a brush intermediate two load circuit brushes of opposite polarity, a vibrator consisting of a coil connected across said load brushes and a movable member operated by said coil, a contact carried by said movable member connected to one of the load brushes and a stationary contact connected to the other end of said field winding, a resistance connected across said contacts and adapted to be alternately cut in and out of circuit with said field winding, electric lamps having a low cold resistance and a high hot resistance permanently connected to said load brushes, a resistance in circuit with said lights to allow said generator to "build up" and a switch having three positions: in one of which it short circuits said generator to prevent its building up; in another of which the resistance is cut into the circuit and in its other position the resistance is cut out to allow the load to be connected directly to the generator.

3. In an electric lighting system a generator having load circuit brushes with a load permanently connected thereto, means for maintaining substantially a constant voltage across said load consisting of a single field winding having one end connected to a brush intermediate said load brushes, a vibrator having a single coil connected across said load brushes and a movable member operated by said coil, a contact carried by said movable member connected to one of the load brushes and a stationary contact connected to the other end of said field winding, a single resistance connected across said contacts and adapted to be entirely and rapidly cut in and out of the circuit with said field winding and means for short circuiting said load circuit when current is not required therein.

4. In an electric lighting system a generator adapted to be driven at a variable speed and having a pair of main brushes and a load circuit containing electric lights permanently connected thereto, means separate from the load for maintaining a voltage below a predetermined limit across said load circuit, consisting of; a principal field winding having one end connected to a third brush set for maximum no load voltage but for a decreasing voltage as the load increases and the other end connected to one of the load brushes through a resistance shunted by a contact with means for rapidly vibrating said contact whereby the vibrator effect is superimposed on the third brush effect on the generator field and means for short circuiting the generator when current is not required in the load circuit and means adapted to be connected in the load circuit for enabling the generator to "build up" if said generator fails to build up when connected to the load circuit, said means being incapable of generating a C. E. M. F.

In witness whereof, I affix my signature.

HENRY E. BORGER.